(12) United States Patent
Dundas

(10) Patent No.: US 6,883,086 B2
(45) Date of Patent: Apr. 19, 2005

(54) REPAIR OF MIS-PREDICTED LOAD VALUES

(75) Inventor: James D. Dundas, Austin, TX (US)

(73) Assignee: Intel Corporation, Santa Clara, CA (US)

(*) Notice: Subject to any disclaimer, the term of this patent is extended or adjusted under 35 U.S.C. 154(b) by 563 days.

(21) Appl. No.: 10/091,825

(22) Filed: Mar. 6, 2002

(65) Prior Publication Data

US 2003/0172255 A1 Sep. 11, 2003

(51) Int. Cl.[7] .............................................. G06F 9/312
(52) U.S. Cl. ........................ 712/205; 712/218; 712/225
(58) Field of Search .............................. 712/205, 218, 712/225

(56) References Cited

U.S. PATENT DOCUMENTS

| | | | |
|---|---|---|---|
| 5,903,749 A | | 5/1999 | Kenner et al. |
| 2002/0091915 A1 | * | 7/2002 | Parady ........................ 712/225 |

OTHER PUBLICATIONS

Nakra et al., "Value Prediction in VLIW Machines", Proceedings of the 26th Annual International Conference on Computer Architecture, IEEE, 1999, pp. 258–269.*
Reinman et al., "Predictive Techniques for Agressive Load Speculation", Proceedings of the 31st Annual ACM/IEEE International Symposium on Microarchitecture, 1998, pp. 127–137.*
David Kroft, Lockup–Free Instruction Fetch/Prefetch Cache Organization, Control Data Canada, Ltd., Canadian Development Division, Mississauga, Ontario, Canada, 1981, pp. 195–201, IEEE.
Chao–Ying Fu, Matthew D. Jennings, Sergei Y. Larin, Thomas M. Conte, Software–Only Value Speculation Scheduling, Department of Electric & Computer Engineering, North Carolina State University, Raleigh, NC., pp. 1–23.
Chao–Ying Fu, Matthew D. Jennings, Sergei Y. Larin, Thomas M. Conte, Value Speculation Scheduling for High Performance Processors, Department of Electric & Computer Engineering, North Carolina State University, Raleigh, NC., pp.—10.
Huiyang Zhou, Chao–Ying Fu, Eric Rotenberg, Thomas M. Conte, A Study of Value Speculative Execution and Mis-speculation Recovery in Superscalar Microprocessors, Department of Electric & Computer Engineering, North Carolina State University, pp.—23.

* cited by examiner

Primary Examiner—William M. Treat
(74) Attorney, Agent, or Firm—John F. Travis

(57) ABSTRACT

When fetching a load value for a load instruction results in a cache miss, the load instruction and any load-dependent instructions may be speculatively executed with a predicted load value and retired before the missing cache line is retrieved and the actual load value is determined. By storing the predicted load value in a table, when the actual load value is determined it may be compared with the predicted load value from the table. If the predicted load value was incorrect, the load and load-dependent instructions may be re-executed with the actual load value. A compiler may determine which load instructions are highly predictable and likely to result in cache misses, and designate only those load instructions for speculative execution.

30 Claims, 7 Drawing Sheets

Original Code Sequence

```
ld      r1, y
add     r5 < r1, 4
shl     r5, 1
or      r6 < r1, r5
```

Modified Code Sequence

```
ldpv    r1, y
add     r5 < r1, 4
shl     r5, 1
or      r6 < r1, r5
  .
  .
chkpv   r1, y, REPAIR
  .
  .
```

REPAIR:
```
ld      r1, y
add     r5 < r1, 4
shl     r5, 1
or      r6 < r1, r5
ret
```

FIG. 1

| ID | ADDRESS | VALIDITY | REGISTER NO. | SIZE | PREDICTED VALUE | ACTUAL VALUE | AVV |
|----|---------|----------|--------------|------|-----------------|--------------|-----|
|    |         |          |              |      |                 |              |     |
|    |         |          |              |      |                 |              |     |
|    |         |          |              |      |                 |              |     |

| Command | Load Address Operands | ID | PV Index | Dest Register |

'ldpv' Instruction Format

| Command | Load Address Operands | ID | Branch Addr | Dest Register |

'chkpv' Instruction Format

FIG. 6

REPAIR OF MIS-PREDICTED LOAD VALUES

BACKGROUND

1. Technical Field

An embodiment of the invention relates generally to processors, e.g., computer processors, and in particular relates to speculative execution (executing with a predicted value rather than the actual value) of load instructions.

2. Description of the Related Art

Load instructions typically retrieve the load data from a data cache before placing the data in a register. Although the load instruction itself may be available from an instruction cache, the data cache might not contain the requested load value, resulting in a cache miss. Execution of the load instruction will be delayed while waiting for the missing cache line to be retrieved from main memory or a lower-level cache, and any associated load-dependent instructions also have to wait until after the load instruction completes execution. Load-dependent instructions are instructions that directly or indirectly use the load value after it has been loaded by the load instruction. If multiple loads are stalled in this manner, and all the associated load-dependent instructions are waiting, the execution unit can come to a virtual standstill. Speculatively executing the load and load-dependent instructions using a predicted load value is a partial solution to this problem, but conventional systems cannot retire the speculatively-executed load instruction until the prediction is verified by retrieving the actual load value. This can cause the retirement unit to bog down, which can eventually stall the entire machine.

BRIEF DESCRIPTION OF THE DRAWINGS

The invention may best be understood by referring to the following description and accompanying drawings that are used to illustrate embodiments of the invention. In the drawings:

FIG. 1 shows a generation of modified program code to enable use of a storage area for a predicted load value, according to one embodiment of the invention.

FIG. 6 shows formats for ldpv and chkpv instructions, according to one embodiment of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

In various embodiments, the invention may enable storing a predicted load value and related information in a storage area used to track cache misses for load instructions, so that the load instruction and/or associated load-dependent instructions may be executed speculatively and retired before the actual load value for the load instruction is determined. When the actual load value is determined, the actual load value may be compared with the stored predicted load value to determine if the predicted load value was correct. If the actual load value does not match the stored predicted load value, the effects of executing with an incorrect predicted load value may be corrected by executing repair code. As used herein, 'repair' code includes load and/or load-dependent instructions that execute with a correct actual load value, after the same/equivalent load and/or load-dependent instructions were previously executed with an incorrect predicted load value.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Figure 2:
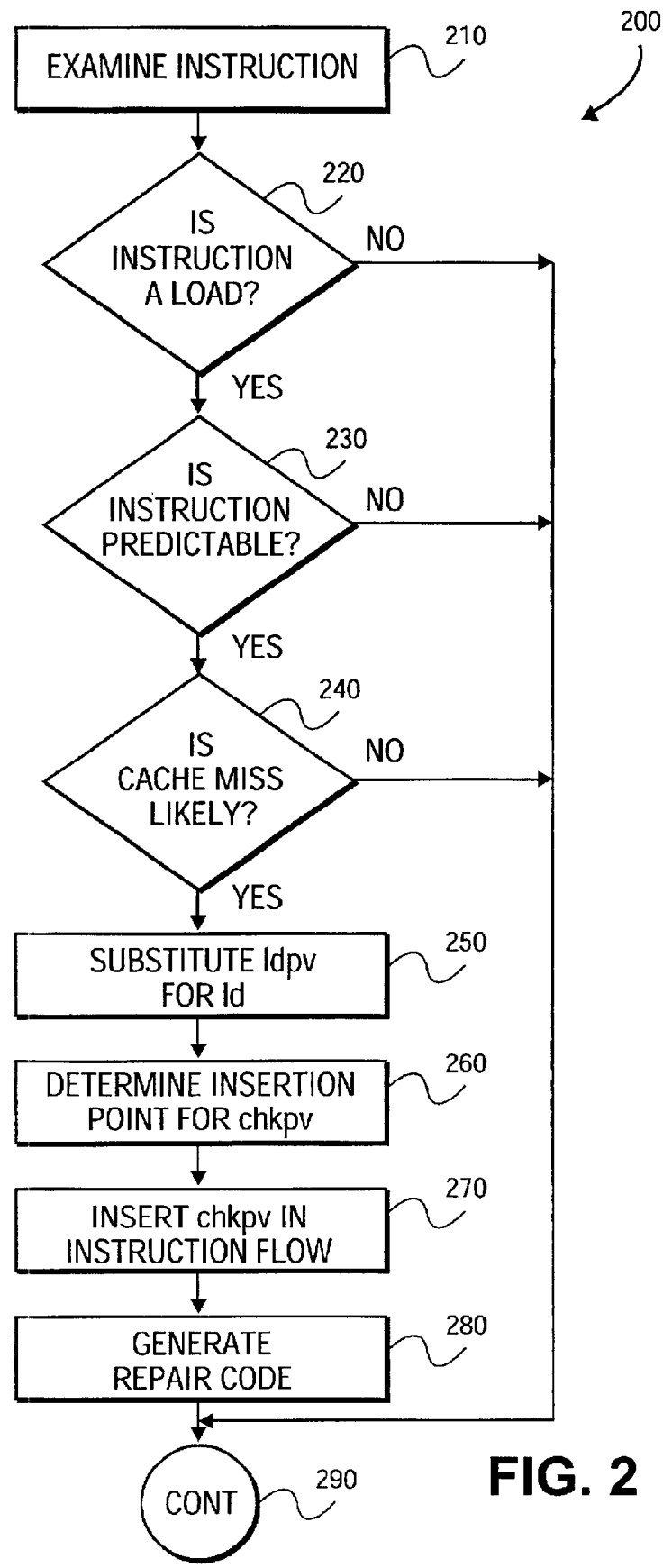
FIG. 2 shows a flow chart of a method performed by a compiler to generate the modified code of FIG. 1, according to one embodiment of the invention.

FIG. 1 shows a generation of modified program code to enable use of a storage area for a predicted load value, according to one embodiment of the invention. While the exemplary embodiment of FIG. 1 shows a conversion of source code to source code, other embodiments may include other types of conversion (e.g., source code to object code). FIG. 2 shows a flow chart of a method performed by a compiler to generate the modified code of FIG. 1, according to one embodiment of the invention. While in the exemplary embodiment the modification is performed by a compiler, alternative embodiments may have this modification performed by other entities (e.g., an emulator). While the following text describes FIGS. 1 and 2 with respect to one another, the code of FIG. 1 may be generated without the method of FIG. 2 and the method of FIG. 2 may generate code other than that shown in FIG. 1. The particular instruction labels and instruction formats shown are for example only—it will be appreciated that other labels and formats may also be used.

The original code sequence of FIG. 1 shows a load instruction (ld) that loads a value at address y into register 1. Subsequent exemplary instructions to perform an addition (add), shift left (shl), and logical OR (or) may perform the following operations, respectively: 1) add 4 to the value in register 1 and place the result in register 5, 2) shift the contents of register 5 to the left by one bit, and 3) perform a logical OR on the contents of registers 1 and 5 and place the result in register 6. The exemplary add, shl, and or instructions are referred to herein as load-dependent instructions because they directly or indirectly use the value that was loaded into register 1 by the load instruction ld. Although the ld, add, shl, and or instructions are shown in immediate sequential order for simplicity, in one operation other instructions (not shown) may be included between them.

In the exemplary embodiment of FIG. 2, a compiler examines each instruction of the original code sequence at block 210 to determine if the instruction meets certain criteria. The criteria are that the instruction is a load instruction (block 220), and that the load instruction is predictable according to predefined requirements (block 230), and that retrieving the load value is likely to create a cache miss according to other predefined requirements (block 240). If any of these criteria are not met, then the instruction may be deemed unsuitable for embodiments of the invention, and control may move to block 290 to continue with the compile process. If all these criteria are met, then the instruction may be deemed suitable for speculative execution under embodiments of the invention, and at block 250 the ld instruction in the original code of FIG. 1 is replaced by a load-predicted-value (ldpv) instruction in the modified code of FIG. 1. While the exemplary embodiment of FIG. 2 shows that the ld instruction must be both predictable and likely to create a cache miss, other embodiments may use only one, or neither, of these two requirements.

The ldpv instruction is an instruction which loads a predicted value of the specified variable if the actual value is not immediately available due to a cache miss when the actual value is requested. The ldpv instruction loads the actual value if the actual value is immediately available from cache. Various techniques (not described) for generating and providing a predicted load value for the ldpv instruction may be used. Any feasible technique may be used that does not require retrieving the predicted load value from the missing cache line. For example, predicted load values may be obtained from a predicted-value table (not shown), indexed using part of the ldpv instruction address.

In FIG. 1, the compiler inserts a check-predicted-value (chkpv) instruction at some point after the ldpv instruction. When executed, the chkpv instruction checks whether execution of the ldpv instruction created a cache miss and whether the predicted load value was correct. Efficient performance of the modified code during execution may depend on placement of the chkpv instruction. At block 260 of FIG. 2, the compiler determines a suitable insertion point and inserts the chkpv instruction into the modified code at that point at block 270. The chkpv instruction may be configured to branch to repair code under conditions described later. At block 280, the compiler generates the repair code shown in FIG. 1, before continuing the compile operation at block 290. While in one operation, the chkpv instruction is inserted sufficiently far after the ldpv instruction that the cache line (and therefore the actual load value) is likely to be available by the time the chkpv instruction is executed, alternate embodiments may use other criteria to determine where to place the chkpv instruction.

While the exemplary embodiments use the terms ldpv and chkpv, it is obvious that other terms may also be used for instructions that perform the indicated operations. While in some embodiments ldpv and chkpv are each implemented as single instructions, in other embodiments the operations of ldpv and/or chkpv may be implemented as multiple instructions.

In the exemplary embodiment, if the chkpv instruction detects a mis-prediction (i.e., the load value was incorrectly predicted), execution may branch to repair code to re-execute the affected instructions using the actual load value, and then return to continue execution of the subsequent code. In the modified code sequence of FIG. 1, the repair code is labeled REPAIR, and duplicates the load-dependent instructions. While in the embodiment of FIG. 1 the repair code also includes the original load instruction to load the actual load value into the register, in another embodiment the actual load value is placed into the proper register through other means and the load instruction is excluded from the repair code.

In one operation, the repair code includes the instructions that were directly affected by the load value (e.g., the load and/or load-dependent instructions) but excludes any intervening instructions that were not load-dependent. In another operation, the repair code repeats all code from the load instruction to the final load-dependent instruction. As will be appreciated, the repair code may also include any other needed instructions, for example instructions necessary to enter and exit the repair code. In the exemplary operation of FIG. 1, a return instruction (ret) is shown for branching back to the code following the chkpv instruction, but any suitable instructions may be used to exit the repair code. In another operation, the repair code may contain instructions to update a prediction structure (e.g., a load value prediction unit that may be implemented in hardware, software, or a combination of both). In another operation, the repair code may include instructions to optimize processor performance (e.g., data stream prefetch instructions). In still another operation, in a multithreaded processor implementation, special fork instructions may be used to trigger secondary threads to optimize the performance of the primary thread.

In one operation, the load instruction is not followed by any load-dependent instructions. For example, the load value may be loaded to a special register from where the load value is subsequently processed by hardware in a manner other than by instruction execution. In such an operation, only the load operation is re-executed executed in the repair code, and any reference to load-dependent instructions herein may be ignored.

Figure 3:
FIG. 3 shows a storage area to store predicted load values and related information, according to one embodiment of the invention.

FIG. 3 shows a storage area to store predicted load values and related information, according to one embodiment of the invention. The storage area may be organized into a table 300, with each row of the illustrated table 300 corresponding to an entry in the table. The illustrated embodiment of FIG. 3 shows a capacity for four entries, but other embodiments may permit more or fewer entries, and a particular embodiment may have capacity for only one entry. While in one embodiment table 300 is implemented as a content addressable memory (CAM), other embodiments may implement table 300 differently (e.g., a series of registers, a combination of a CAM and SRAM, etc.). In a particular embodiment, table 300 is implemented in miss status holding registers (MSHR) by adding at least a predicted value field to the registers. In another particular embodiment, table 300 is separate from the MSHR, and the entries of table 300 are used to reference entries in the MSHR.

Each entry of the table 300 may be used to hold information, including a predicted load value, related to a particular load instruction that resulted in a cache miss when attempting to retrieve the load value. The cache miss may be used to trigger entry of the related information into table 300. The load instruction may be executed speculatively with the predicted load value while the missing cache line is retrieved. Subsequent load-dependent instructions may also be executed speculatively based on the predicted load value. When the missing cache line is retrieved and the actual load value is determined, the table 300 may provide the predicted load value so that the actual and predicted load values may be compared. If the actual and predicted load values match, the speculative execution is determined to have produced the correct results, and there may be no need to re-execute the load and/or load-dependent instructions. However, if the actual and predicted load values do not match, the load and/or load-dependent instructions should be re-executed, using the now-available actual load value.

To identify the speculatively executed load instruction whose predicted load value is to be compared with the actual value, table 300 may include various fields. In the exemplary embodiment of FIG. 3, these fields include the following:

ID—An identifier that uniquely identifies the particular load instruction or instruction sequence. Although in some embodiments other fields may be used for this purpose (e.g., see the description for the Address and Register No. fields below), the ID field may be used to avoid ambiguity if the other fields might contain duplicate information for multiple entries. In one embodiment, the identifier is placed in the ldpv and/or chkpv instructions at compile time. In another embodiment, the identifier is assigned at execution time.

Address—The address of the actual load value that is being retrieved. In one embodiment, the Address field is used instead of the ID field to determine whether an actual load value from a retrieved cache line has an associated predicted load value in the table 300. In another embodiment, the address field is used in combination with the Size field as described below.

Validity—Indicates whether a particular entry in table 300 contains valid information, or if that particular entry contains invalid information and should be ignored. For example, when an entry has been used and is no longer necessary, it may be marked as invalid so that it will not be used in further comparisons. In one embodiment, the Validity field is used to indicate that a location in table 300 is currently unused and is therefore available for a new entry. In other embodiments, other techniques may be used to indicate the validity of an entry or to remove the entry from the table 300.

Register No.—Indicates the register that is the destination register of the load instruction. While in one embodiment the Register No. field indicates a physical register, in another embodiment the Register No. Field indicates a logical register. Other arrangements for indicating a particular register may also be used. In one embodiment the register specified by the ldpv instruction is reserved for subsequent use by the chkpv instruction, and the Register No. Field serves to identify a specific entry, making the ID field unnecessary.

Size—Indicates the size (in bits, bytes, words, or other units of size) of the load value to be loaded by the load instruction. The Size field may be used in conjunction with the Address field to determine if the requested load value spans multiple cache lines.

Predicted Value—Indicates the predicted value that is being used for speculative execution of the load instruction. When the actual value is determined, the actual value may be compared with the contents of the Predicted Value field to determine if the predicted value used in speculative execution was correctly predicted.

Actual Value—Indicates the actual load value once the actual load value is obtained. While in one embodiment, this value is placed in the appropriate entry of table 300 when the cache line is retrieved, in another embodiment the chkpv instruction obtains the actual value from another source and the Actual value field is not used.

AVIV—Indicates actual value validity, when the Actual value field is used. The AVIV field is used to indicate that the actual value has been obtained from the retrieved cache line and placed into the Actual value field.

The foregoing list of fields and their purposes represents one embodiment of table 300. Other embodiments may have more or fewer fields, the fields may be labeled differently, and the fields may serve different purposes than those described.

Figure 4:
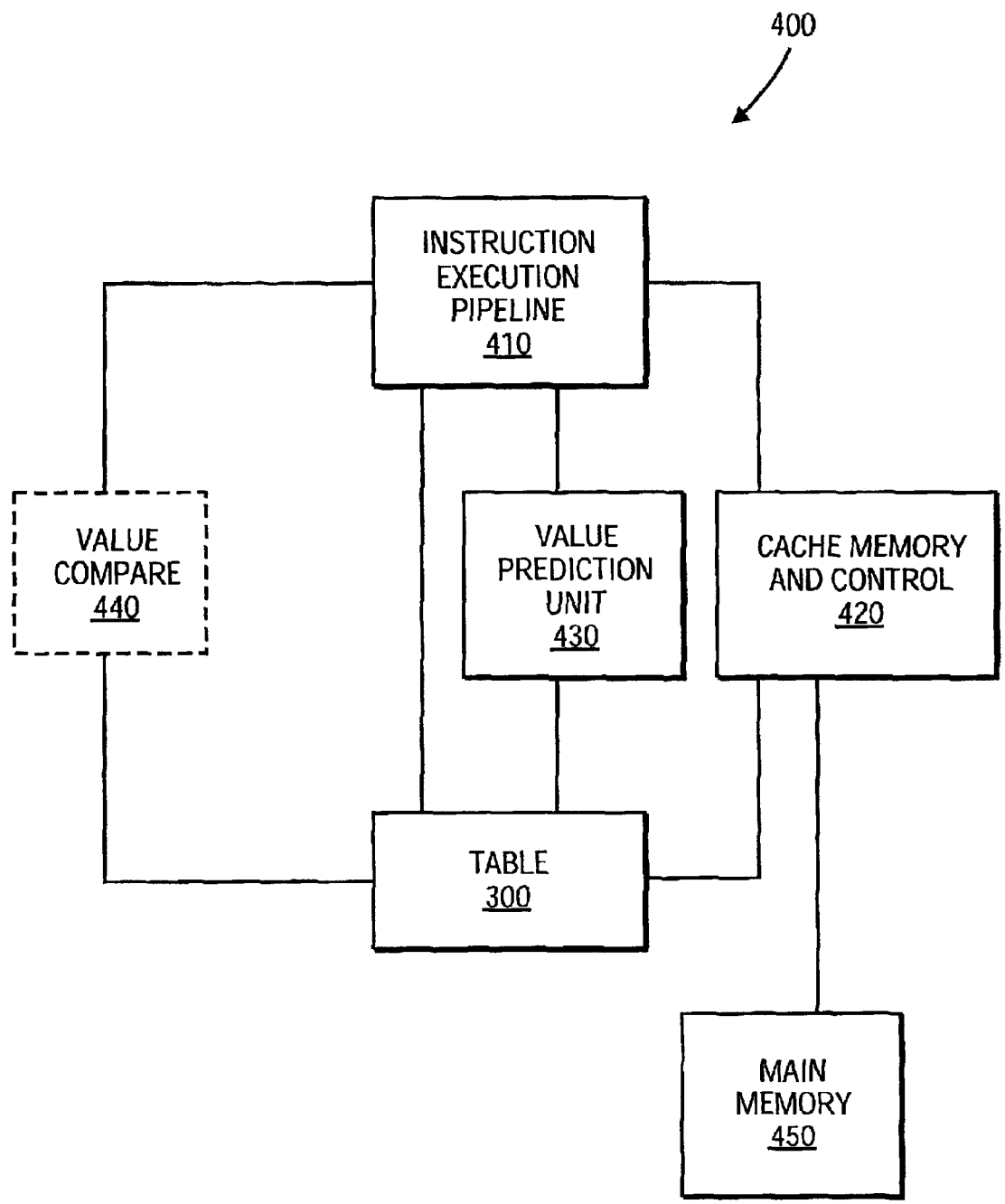
FIG. 4 shows a block diagram of a system having a logic circuit to use predicted load values, according to one embodiment of the invention.

FIG. 4 shows a block diagram of a system having a logic circuit to use predicted load values, according to one embodiment of the invention. In the exemplary embodiment of FIG. 4, system 400 includes instruction execution logic in the form of an instruction execution pipeline 410, cache memory and control logic 420, table 300, value prediction unit 430, main memory 450, and value compare logic 440, which may be incorporated into one or more of the other elements. Other logic elements (not shown) may also be used in conjunction with the illustrated elements.

Figure 5A:
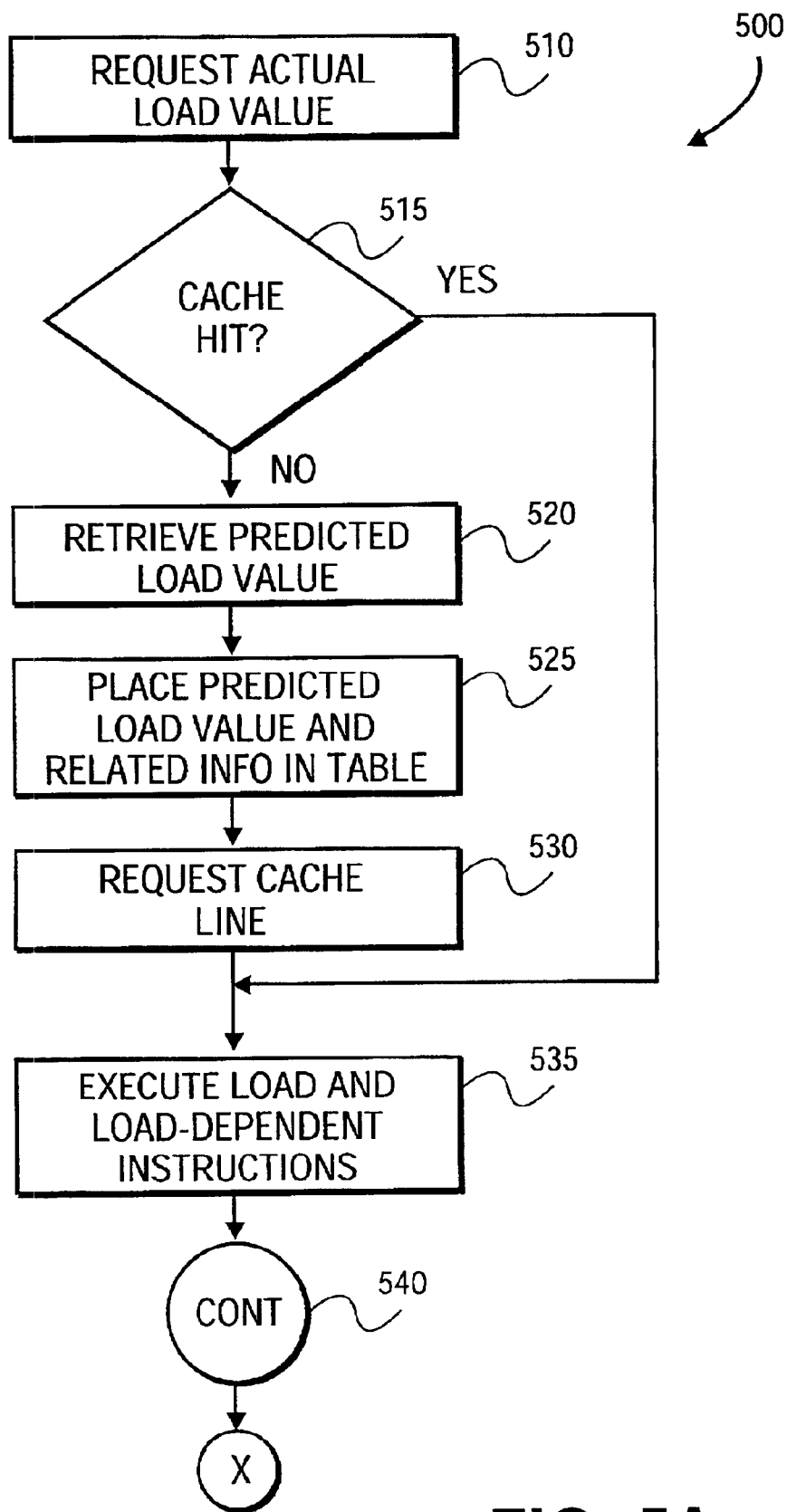
FIGS. 5A, 5B show a flow chart of operations involving use of a storage table to hold a predicted load value, according to one embodiment of the invention.
Figure 5B:
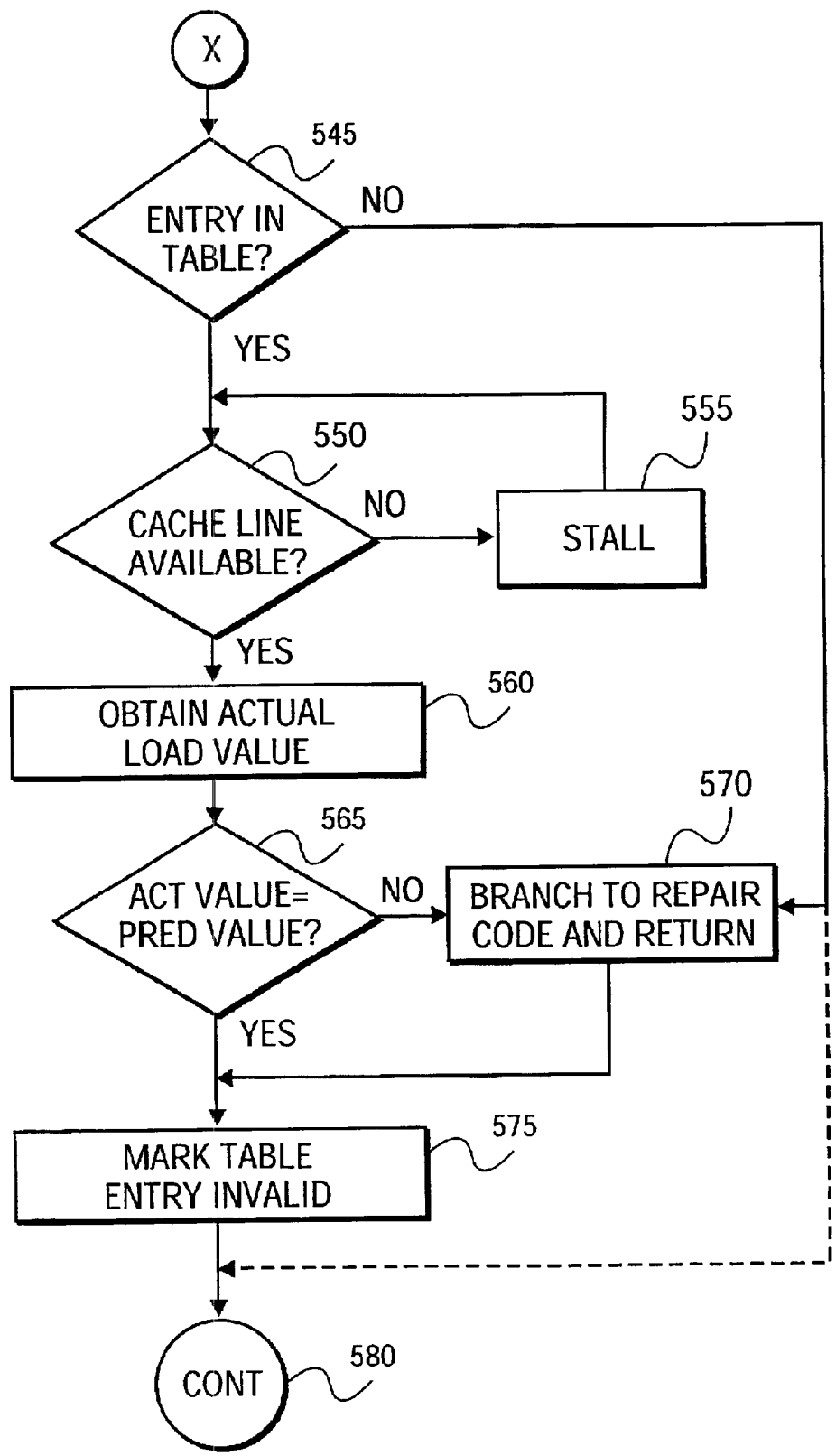

FIGS. 5A, 5B show a flow chart of operations involving use of a storage table to hold a predicted load value, according to one embodiment of the invention. In flow chart 500, FIG. 5A shows an operation for execution of an ldpv instruction and the associated load-dependent instructions. FIG. 5B shows an operation for executing a chkpv instruction to verify the predicted load value, and for branching to repair code if a mis-prediction occurred. It is understood that the terms 'ldpv' and 'chkpv' are for example only. Other terms may be used to describe the relevant instructions without deviating from embodiments of the invention.

The following text describes the system 400 and the operation of flow chart 500 in more detail. In the exemplary embodiments, the system 400 and the operation in flow chart 500 are sometimes described with reference to one another. However, it should be understood that the system 400 may be used for operations other than that described in flow chart 500, and the operation in flow chart 500 may be implemented in systems other than system 400.

An exemplary operation begins when a ldpv instruction is executed, triggering a request to retrieve an actual load value as shown in block 510 of FIG. 5A. If the request results in a cache hit at block 515, execution continues at block 535 by completing execution of the ldpv instruction with the actual load value and then executing the subsequent load-dependent instructions. If the request results in a cache miss at block 515, speculative execution is performed by following the operations of blocks 520–535. At block 520, the predicted load value is retrieved, e.g., from a value prediction unit. Any feasible method may be used to determine the predicted load value, maintain it in the value prediction unit, and provide it when requested at block 520. At block 525, the predicted load value and any necessary associated information may be placed into an available location of a table, e.g., the table 300 of FIG. 4. The missing cache line is requested at block 530. From block 530, control passes to block 535, where operations may continue by completing execution of the ldpv instruction with the predicted load value and then executing the subsequent load-dependent instructions. Although executed speculatively, the load and load-dependent instructions may be retired after execution without waiting for the actual load value to be determined. While in one embodiment the operations of blocks 520–535 are performed sequentially in the order shown, in other embodiments the operations may be performed in a different order, and in a particular embodiment some of the operations are performed concurrently.

In some operations, other instructions not described herein may be disposed among the load/load-dependent instructions and be executed in block 535. Some operations may also continue with execution of other instructions at block 540, instructions that are disposed between the load-dependent instructions and the chkpv instruction of FIG. 5B. The specific nature of these other instructions may not be relevant to the embodiments of the invention and are not described herein.

With reference to the operations of FIG. 5A, in the exemplary system 400 of FIG. 4 execution of all the aforementioned instructions takes place in the instruction execution pipeline 410, cache hit/miss status is determined in cache memory and control logic 420, cache line requests resulting from a cache miss may be sent to main memory 450 and/or another level of cache, predicted load values are created and/or maintained in value prediction unit 430, and table 300 is used to hold the predicted load value and associated information when triggered to do so by execution of a ldpv instruction.

A chkpv instruction associated with the ldpv instruction may be used to identify a mis-prediction and take corrective action. Placement of the chkpv instruction in a program was shown in the exemplary embodiment of FIG. 1 and described in the associated text. FIG. 5B shows the execution of a chkpv instruction or its equivalent. Execution may include the operations described in the following paragraphs.

At block 545, the table is checked to determine if it contains an entry associated with a cache miss at block 515. Checking the table may include comparing an indicator in the chkpv instruction to determine if any valid entry in the table includes the same indicator. This comparison may take different forms in different embodiments. While in one embodiment a load address specified in the chkpv instruction is compared with the address field in the table, in another embodiment the destination register number specified in the chkpv instruction is compared with the Register No. Field in the table, and in still another embodiment an identifying field in the chkpv instruction is compared with the ID field in the table.

If an associated entry is found in the table, that may indicate that a cache miss occurred at block 515 and the cache line containing the actual load value was requested at block 530. At block 550, it is determined if the requested cache line is available yet. While in one embodiment execution stalls at block 555 until the requested cache line becomes available, in another embodiment execution may temporarily be redirected to other code until the requested cache line becomes available. In a particular embodiment, the chkpv instruction attempts to load the actual value in the same manner as the original ldpv instruction, and another cache miss may occur if the cache line is not available. However, this second cache miss may not result in another cache line request since the cache line was previously requested.

When the requested cache line is available, at block 560 the actual load value for the load instruction is obtained from the retrieved cache line and at block 565 the actual load value is compared with the predicted value from the Predicted Value field of the table. In one embodiment, the actual value is placed in the table when the requested cache line is retrieved, and comparison includes comparing the Predicted value field with the Actual value field of the same table entry. In another embodiment, the chkpv instruction loads the actual value from the retrieved cache line, and then retrieves the Predicted value from the table to make the comparison. In the exemplary embodiment of FIG. 4, the comparison is performed in value compare logic 440. While in one embodiment the value compare logic 440 is dedicated to the execution of the chkpv instruction, in another embodiment the value compare logic 440 includes much of the same logic used in executing other comparison-type instructions such as conditional branch instructions. As indicated by phantom lines in FIG. 4, in some embodiments value compare logic 440 may be part of other circuits, such as instruction execution pipeline 410.

If the comparison at block 565 determines the actual load value is the same as the predicted load value, then the previously-executed ldpv and subsequent load-dependent instructions were executed using correct values, and re-execution of those instructions may not be necessary. If the table entry corresponding to the associated ldpv instruction is no longer needed, in one embodiment that entry may be removed or invalidated at block 575. In another embodiment, the old entry may left in the table until it is pushed out by a new entry. Execution may continue with the subsequent code at block 580.

If the comparison at block 565 determines that the actual load value is different than the predicted load value, then the previously-executed ldpv and subsequent load-dependent instructions were executed using incorrect values. Correction may require re-executing some or all of the affected instructions. In the embodiment of FIG. 5B, control moves to block 570 to execute repair code using the actual load value, after which control moves to block 575. The contents of the repair code may be as previously described for FIG. 1. At block 575, the table entry may be removed, invalidated, or left alone as described in the previous paragraph. Execution may then continue with subsequent code at block 580.

Returning to block 545, if there is no associated entry in the table, execution may handled in various ways, depending on the manner of replacing table entries. In one embodiment, if there are no unused entries in the table, each new entry may cause an old entry to be removed from the table to make room, even if the old entry has not yet been used by a chkpv instruction. Various criteria may be used to determine the priority used in removal. This action may cause a table entry to be removed before the associated chkpv instruction has had a chance to use it. In this embodiment, if there is no entry in the table, the worst-case assumption is that an entry previously existed but was removed to make room. To assure correct execution, the repair code may be executed using the actual value. In the flow chart of FIG. 5B, this occurs by branching from block 545 to block 570 to execute the repair code, and block 575 may subsequently be skipped. In another embodiment, no corresponding entry in the table at block 545 may indicate that a cache miss did not occur, and execution of repair code is therefore unnecessary, so execution goes directly to block 580 as shown by the dashed line of FIG. 5B.

In one embodiment, the instructions may be implemented in hardware in the instruction set of a processor. Each of the exemplary ldpv and chkpv instructions may be implemented as a set of one or more executable instructions in the instruction set. In a particular embodiment, the instructions may be generated by hardware during execution and inserted into a trace cache rather than being placed into the program by a compiler.

FIG. 6 shows formats for ldpv and chkpv instructions, according to one embodiment of the invention. In the exemplary embodiment, the ldpv instruction has a Command field, defining the instruction as a ldpv instruction. The Load Address Operands field identifies the load address from which the actual load value is being requested in the load operation. It is this address that may trigger the cache miss when the instruction is executed. While in one embodiment this field includes the load address, in another embodiment this field identifies a register containing the load address. Either embodiment may also include an offset value to be used in combination with the indicated address. The ID field is a unique identifier to be placed in the ID field of the table 300, if necessary. While in one embodiment the PVT Index field may index a predicted value table that holds predicted values for multiple load instructions, other embodiments may use other techniques to locate the particular predicted load value that is to be obtained for speculative execution of the particular ldpv instruction. The Destination Register field contains the register that is to be loaded with the ldpv instruction.

In the exemplary embodiment, the chkpv instruction also contains a Command field, which defines the instruction as a chkpv instruction. The contents of the Load Address Operands field are identical to the contents of the Load Address Operands field in the corresponding ldpv instruction, and may be used to identify which ldpv instruction in table 300 the chkpv instruction is associated with. Simlarly, the contents of the ID field are identical to the contents of the ID field in the corresponding ldpv instruction and may be used to identify the ldpv instruction with which the chkpv instruction is associated. While in one embodiment the Branch Address field contains the address to which execution will jump if the chkpv instruction determines that the predicted and actual load values do not match, in another embodiment the Branch Address field identifies a register containing that address. Referring to the Modified Code Sequence of FIG. 1, the Branch Address indicates the entry point of the repair code. The contents of the Destination Register field may be identical to the Destination Register field of the ldpv instruction.

Although specific formats are shown for the exemplary ldpv and chkpv instructions, other formats may also be used, containing fewer, more, or different fields than shown, and arranged in different order.

The foregoing description is intended to be illustrative and not limiting. Variations will occur to those of skill in the art. Those variations are intended to be included in various embodiments of the invention, which are limited only by the spirit and scope of the appended claims.

I claim:

1. An apparatus, comprising:
   execution logic to execute a load instruction with a predicted load value; and
   a storage structure having a first field to store the predicted load value, the storage structure to be used in repairing a mis-prediction of the predicted load value after a cache miss caused by a request of an actual load value.

2. The apparatus of claim 1, wherein:
   the execution logic is to execute the load instruction with the actual load value responsive to a cache hit caused by execution of the load instruction.

3. The apparatus of claim 1, wherein:
   the storage structure includes a miss status holding register.

4. The apparatus of claim 1, wherein:
   the storage structure includes a second field to indicate a destination register for the load instruction.

5. The apparatus of claim 1, wherein:
   the storage structure includes a second field to store an address identifying a location of the actual load value.

6. A system, comprising:
   a main memory;
   a cache memory coupled to the main memory;
   instruction execution logic to execute a load instruction with an actual load value if a request of the actual load value results in a cache hit in the cache memory and to execute the load instruction with a predicted load value if the request of the actual load value results in a cache miss in the cache memory; and
   a storage structure coupled to the instruction execution logic and having a first field to store the predicted load value if the request of the actual load value results in the cache miss.

7. The system of claim 6, wherein:
   the storage structure includes a miss status holding register.

8. The system of claim 6, wherein:
   the instruction execution logic includes logic to execute a check instruction to compare the predicted load value from the first field with the actual load value.

9. The system of claim 8, wherein:
   the instruction execution logic includes logic to branch to repair code if the predicted load value is different than the actual load value.

10. The system of claim 6, wherein:
    the storage structure is to not store the predicted load value if the request for the actual load value results in the cache hit.

11. An apparatus, comprising:
    an instruction set in a processor, the instruction set including
    a first set of one or more instructions to load a predicted load value and to place the predicted load value in a table in response to an attempt to load an actual load value resulting in a cache miss; and
    a second set of one or more instructions to compare the predicted load value from the table with the actual load value and branch to repair code if the actual load value is different than the predicted load value.

12. The apparatus of claim 11, wherein:
    the first set is to not place the predicted load value in the table in response to the attempt to load the actual load value resulting in a cache hit.

13. The apparatus of claim 11, wherein:
    the second set is to examine the table to determine if the table includes the predicted load value.

14. The apparatus of claim 11, wherein:
    the first and second sets are to be specified by a compiler.

15. The apparatus of claim 11, wherein:
    the first and second sets are to be specified during execution.

16. A method, comprising:
    executing a load instruction using a predicted load value responsive to a cache miss resulting from an attempt to execute the load instruction with an actual load value;
    placing the predicted load value in a table;
    retrieving the actual load value;
    comparing the actual load value with the predicted load value in the table to determine if the predicted load value was mis-predicted; and
    re-executing at least one of the load instruction and load-dependent instructions using the actual load value if the predicted load value was mis-predicted.

17. The method of claim 16, wherein:
    said comparing includes comparing after the load instruction is retired.

18. The method of claim 16, wherein:
    said placing includes placing the predicted load value in a miss status holding register.

19. A machine-readable medium that provides instructions, which when executed by a set of one or more processors, cause said set of processors to perform operations comprising:
    executing a load instruction using a predicted load value responsive to a cache miss resulting from an attempt to execute the load instruction with an actual load value;

placing the predicted load value in a table if said attempt results in a cache miss;

comparing the actual load value with the predicted load value from the table to determine if the predicted load value was mis-predicted; and re-executing at least one of the load instruction and load-dependent instructions using the actual load value if the predicted load value was mis-predicted.

20. The medium of claim 19, wherein:

said re-executing includes branching to repair code.

21. The medium of claim 19, wherein:

said comparing includes determining if the table includes an entry corresponding to the load instruction.

22. The medium of claim 19, wherein:

said placing includes placing the predicted load value in a miss status holding register.

23. A method, comprising:

generating first code to load an actual load value if requesting the actual load value results in a cache hit, and to load a predicted load value and place the predicted load value in a table if requesting the actual load value results in a cache miss;

generating second code to compare the predicted load value from the table with the actual load value; and generating third code to execute at least one of a load instruction and a load-dependent instruction with the actual load value.

24. The method of claim 23, wherein:

said generating the second code includes generating code to determine if the table includes an entry generated by the first code.

25. The method of claim 23, wherein:

said generating the third code includes generating code to be executed if executing the second code determines the predicted load value is different than the actual load value.

26. The method of claim 23, further comprising:

generating said first, second, and third code only if it is determined that said requesting the actual load value is likely to result in a cache miss.

27. A machine-readable medium that provides instructions, which when executed by a set of one or more processors, cause said set of processors to perform operations comprising:

generating first code to load an actual load value if requesting the actual load value results in a cache hit, and to load a predicted load value and place the predicted load value in a table if requesting the actual load value results in a cache miss;

generating second code to compare the predicted load value from the table with the actual load value; and generating third code to execute at least one of a load instruction and a load-dependent instruction with the actual load value.

28. The medium of claim 27, wherein:

said generating the second code includes generating code to determine if the table includes an entry generated by the first code.

29. The medium of claim 27, wherein:

said generating the third code includes generating code to be executed if executing the second code determines the predicted load value is different than the actual load value.

30. The medium of claim 27, further comprising:

generating said first, second, and third code only if it is determined that said requesting the actual load value is likely to result in a cache miss.

* * * * *